June 15, 1943. G. H. WALKER 2,322,182
TRANSMISSION DYNAMOMETER
Filed July 13, 1942 2 Sheets-Sheet 1
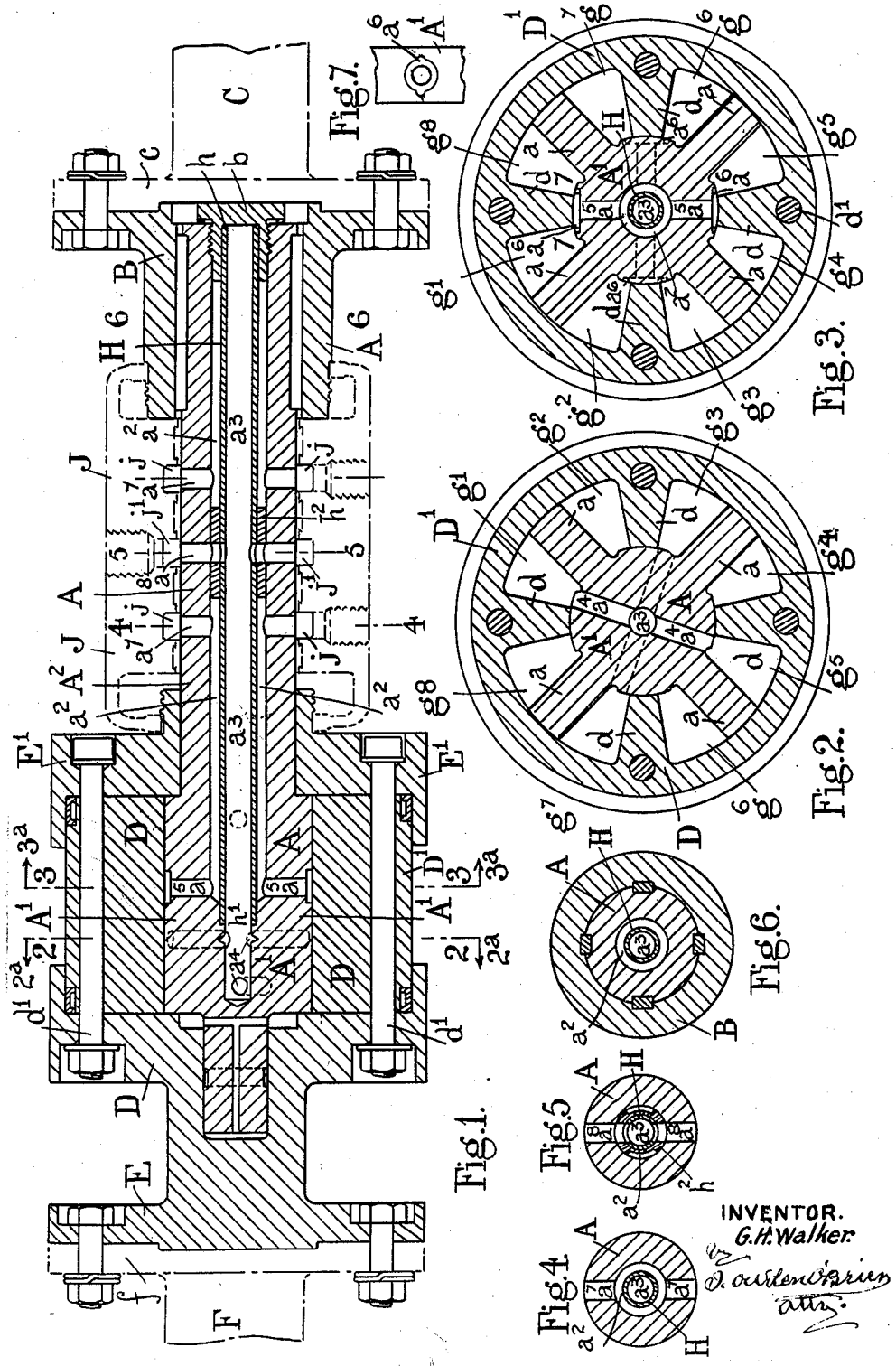

June 15, 1943. G. H. WALKER 2,322,182
TRANSMISSION DYNAMOMETER
Filed July 13, 1942 2 Sheets-Sheet 2

INVENTOR.
G. H. Walker.

Patented June 15, 1943

2,322,182

UNITED STATES PATENT OFFICE 2,322,182

TRANSMISSION DYNAMOMETER

George Henry Walker, Worcester, England, assignor to Heenan & Froude Limited, Worcester, England Application July 13, 1942, Serial No. 450,768
In Great Britain August 13, 1941

4 Claims. (Cl. 265—25)

This invention relates to improvements in transmission dynamometers which are capable of transmitting power from a driving shaft to a driven shaft and also of indicating the magnitude of the torque being transmitted.

The dynamometer according to the invention comprises a driving element connected to the driving shaft and a driven element connected to the driven shaft, the two elements being co-axial and capable of limited agular movement in relation to one another, torque being transmitted from the driving to the driven element by liquid under pressure, such pressure varying with the amount of torque whereby a measurement of the pressure gives an indication of the torque being transmitted.

The invention will be described with reference to the accompanying drawings in which one embodiment is illustrated. In these drawings:

Fig. 1 is a longitudinal section through the dynamometer.

Fig. 2 is a section on line 2—2 Fig. 1, looking in the direction of the arrows $2^a$.

Fig. 3 is a section on line 3—3 Fig. 1, looking in the direction of the arrows $3^a$.

Fig. 4 is a section on line 4—4 Fig. 1.

Fig. 5 is a section on line 5—5 Fig. 1.

Fig. 6 is a section on line 6—6 Fig. 1.

Fig. 7 is a plan at the part 7 Fig. 3.

Figure 8:
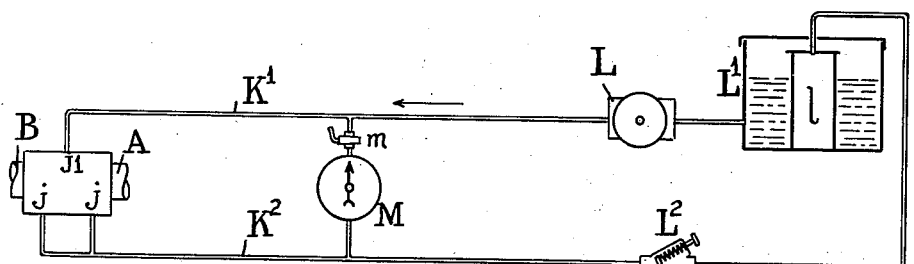
Fig. 8 is a diagrammatic view showing the oil or other liquid measuring device.

In the embodiment of the invention illustrated the driving element is shown as a spider with outwardly radiating arms and the driven element as an annulus surrounding the spider with inwardly radiating arms but it will be obvious after perusal of the following description of the apparatus that the driving and driven elements can be reversed, i. e., the driven element can be the spider and the driving element the surrounding annulus, by slight modification of the valves and passages for the oil or other liquid.

In the following description the torque transmitting liquid will be referred to as oil which is found to be the most suitable but it is not intended that it should be limited to oil as other liquids can be employed in place thereof.

The embodiment of the invention illustrated in the drawings shows a driving element A, to the end of which a coupling B is keyed or otherwise secured, the coupling B being bolted or otherwise secured to the flange $c$ of the driving shaft C, and a driven element D formed with or secured to a coupling E by which it can be bolted or otherwise secured to the flange $f$ of the driven shaft F.

The driving element A is in the form of a hollow shaft for the greater part of its length but near the end remote from the coupling B it is formed as a spider with a boss $A^1$ from which a number of arms $a$ radiate (four such arms being shown in the drawings), the arms $a$ being spaced around the boss at equal angular distances apart.

The driven element D is in the form of an annulus $D^1$ from which arms $d$ radiate inwardly, the arms $d$ being equal in number to the arms $a$, and being spaced at equal angular distances apart. The annulus $D^1$ is affixed by the bolts $d^1$ between the coupling member E and a bearing disc $E^1$ both of which are mounted on and capable of angular movement in relation to the shaft-like portions $A^1$ and $A^2$ of the driving element A.

The driven element D is assembled around the spider portion of the driving element A with the arms $d$ of the former interspaced between the arms $a$ of the latter thereby forming eight radial chambers or spaces $g^1$ to $g^8$. The arms $a$ of the driving element extend to the inner surface of the annulus $D^1$ and the arms $d$ of the driven element extend to the surface of the boss $A^1$ of the spider so that each of the chambers $g^1$ to $g^8$ is bounded by an arm $a$, an adjacent arm $d$, the boss $A^1$ and the annulus $D^1$.

Under working conditions four of the chambers, i. e., the chambers $g^1$, $g^3$, $g^5$, $g^7$ are filled with oil at a relatively high pressure and the chambers $g^2$, $g^4$, $g^6$ and $g^8$ which alternate with the chambers $g^1$, $g^3$, $g^5$ and $g^7$ are filled with oil at a relatively low pressure. The driving end of the shaft-like portion $A^2$ of the driven element A is closed by a cap $b$ screwed into the end of the cap $b$ also serves to support the end $h$ of a tube H in the interior of the element, the other end $h^1$ of the tube being supported in the interior of the boss $A^1$, the bore of the latter being reduced as shown in Fig. 1 to receive the end $h^1$ of the tube H. The external diameter of the tube H is less than the internal diameter of the shaft-like portion $A^2$ of the driving element so that an annular passage $a^2$ is formed around the tube H and a central passage $A^3$ along the tube H.

The high pressure chambers $g^1$, $g^3$, $g^5$ and $g^7$ are connected to the central passage $a^3$ by the radial passages $a^4$ in the boss $A^1$ of the spider and the low pressure chambers $g^2$, $g^4$, $g^6$ and $g^8$ are connected to the annular passage $a^2$ by the radial passages $a^5$ in the boss $A^1$. The passages $a^4$ enter directly into chambers $g^1$, $g^3$, $g^5$ and $g^7$ as shown in Fig. 2, but the passages $a^5$ connect with the chambers $g^2$, $g^4$, $g^6$ and $g^8$ by ports $a^6$ formed in the boss $A^1$ below the inner ends of the arms $d$ of the driven element as shown in Figs. 3 and 7. The ports $a^6$ also communicate with the high pressure chambers $g^1$, $g^3$, $g^5$ and $g^7$ so that when the arms $d$ are midway between the arms $a$ the high pressure chambers are also in communication with the annular passage $a^2$. The ports $a^6$ also serve as a communication between a high pressure chamber and the succeeding low pressure chamber, i. e., between the chamber $g^1$ and the chamber $g^2$, the chamber $g^3$ and the chamber $g^4$ and so on.

The annular passage $a^2$ is connected by the radial passages $a^7$ with two annular chambers $j$ formed in a sleeve J within which the shaft-like portion $A^2$ of the driving element rotates and the central passage $a^3$ is similarly connected by the radial passages $a^8$ with the annular chamber $j^1$ in the sleeve J. The passages $a^8$ pass through the tube H, the distance pieces $h^2$ of arcuate form separating the tube H from the shaft $A^2$, and through the latter, the distance pieces $h^2$ allowing the low pressure oil in the annular passage $a^2$ to pass to both sides of the passages $a^8$. The annular chambers $j$ are thus in communication with the low pressure chambers $g^2$, $g^4$, $g^6$ and $g^8$ and the annular chamber $j^1$ with the high pressure chambers $g^1$, $g^3$, $g^5$ and $g^7$.

High pressure oil is supplied from a pump to the high pressure chambers $g^1$—$g^7$ through the chamber $j^1$ and the low pressure chambers $g^2$ to $g^8$ are connected through the chamber $j$ to an oil tank. A diagram of such connections is shown in Fig. 8 and will be described later.

Under running conditions, when torque is applied to the driving element A, its arms $a$ tend to approach the arms $d$ of the driven element D and by constriction of space between them to squeeze out the oil which is trapped between the two sets of arms. Simultaneously the outlet ports $a^6$ from the high pressure chambers $g^1$—$g^7$ tend to close while oil from the circulating pump continues to enter freely through the open inlet ports $a^4$ until the pressure of oil therein acting upon the effective area of the arms balances the torque. The pressure of the oil in the high pressure chambers $g^1$—$g^7$ will be substantially the same as that in the supply pipe thereto; and that in the low pressure chambers $g^2$—$g^8$ as in the return pipe therefrom; so that by measuring the differential pressure of the oil between the two pipes by a gauge or equivalent device or in any other convenient way an indication of the torque transmitted is obtained.

In the diagrammatic arrangement shown in Fig. 8, the high pressure chamber $j^1$ is connected by the pipe line $K^1$ with a pump L, preferably driven from an independent source, which supplies the high pressure oil to the dynamometer and the low pressure chambers $j$ are connected by the pipe line $K^2$ to a tank or reservoir $L^1$. The pump L draws oil from the tank $L^1$ which may be mounted beneath the sleeve J so as to catch and retain any leakage therefrom, and delivers it through the sleeve and passages to the high pressure spaces $g^1$—$g^7$ of the dynamometer and thence through the self-adjusting outlet ports $a^6$ to the low pressure spaces $g^2$—$g^8$ and the return oil piping $K^2$ back to the tank $L^1$ in which a strainer $l$ may be fitted.

In order to prevent rotation of the shaft $A^2$ at high speed from breaking the column of oil which is flowing through it, an adjustable relief valve $L^2$ may be inserted in the low pressure oil circuit $K^2$ between the sleeve J and the tank $L^1$. The valve $L^2$ is set to oppose a resistance to the flow of the oil suitable for counteracting the pressure due to centrifugal force.

A differential gauge M calibrated in terms of torque is connected between the high pressure pipe $K^1$ and the low pressure pipe $K^2$ which will give a reading of the differential pressure between the high and low pressure systems, and therefore of the torque. The valve $L^2$ does not introduce any error in the readings of the gauge M because the oil pressure which it sets up is communicated equally to the high and low pressure spaces of the dynamometer. One connection of the differential gauge thus receives high pressure and the other low pressure oil. A damping cock $m$ may be inserted in the former connection or in pipe line $K^1$ in order to prevent fluctuations of torque from causing undue flutter of the indicating needle.

Figure 9:
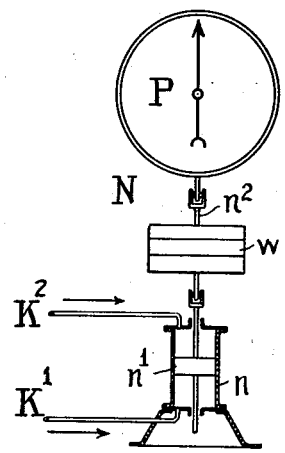
Fig. 9 is a diagrammatic view of a modified torque measuring device which can be substituted for the torque measuring device illustrated in Fig. 8.

Instead of the differential gauge M shown in Fig. 8, a mercury column or other suitable recording device responsive to pressure and therefore capable of being calibrated in terms of torque may be employed. Alternatively a weighing device N such as shown in Fig. 9 may be employed. This weighing device consists of an oil cylinder $n$ having a piston $n^1$ one side of which is connected to the high pressure pipe line $K^1$ and the other to the low pressure pipe line $K^2$. The piston $n^1$ is mounted preferably on a vertical axis and actuates a piston rod $n^2$, which, under the influence of the differential oil pressure, tends to lift weights $w$ which are carried by the upper end of the rod $n^2$. One or more such weights may be utilised, some of them being loose and removable from the suspension means when light torques have to be measured. The piston rod $n^2$ is extended upwardly and coupled to a weighing machine or spring balance P arranged to measure intermediate loads and to act as a vernier to the weights. Both weights and weighing machine are calibrated in units of torque and also, for checking purposes, in units of weight. If desired multiplying levers may be interposed between the weighing machine P or weights W and the piston rod $n^2$.

To prepare the apparatus for indications of torque the fixed weight is adjusted until the pointer of the weighing machine P indicates zero when zero torque is passing through the dynamometer. On generating torque the pressure of oil beneath the piston $n^1$ exceeds that of the low pressure oil above it and the piston tends to raise the fixed weight, the relieved load and consequently the torque being indicated by the weighing machine. On further increasing the torque beyond the capacity of the weighing machine one or more loose weights are added to the piston rod and their value to the readings of torque.

I claim:

1. A transmission dynamometer capable of transmitting power from a driving shaft to a driven shaft and also of indicating the magnitude of the torque being transmitted comprising a driving element connected to the driving shaft and a driven element connected to the driven shaft, the two elements being co-axial and capable of limited angular movement in relation to one another, torque being transmitted from the driving to the driven element by liquid under pressure, such pressure varying with the amount of torque whereby a measurement of the pressure gives an indication of the torque being transmitted, said driving element consisting of a spider having a plurality of radial arms arranged at equal angular distances apart and said driven element consisting of an annulus surrounding the driving element and having the same number of radial arms which project inwards towards the boss of the driving element and are interspaced between the arms of the latter, the interspaced radial arms of the two elements thus forming a series of chambers the number of which is twice the number of arms on each element, half the number of these chambers being filled under running conditions with liquid under pressure, the magnitude of which depends upon the magnitude of the torque to be transmitted, and the remaining chambers which alternate with those filled with liquid under high pressure being filled with liquid under relatively low pressure and means for measuring the difference in pressure between the two series of chambers.

2. A transmission dynamometer capable of transmitting power from a driving shaft to a driven shaft and also of indicating the magnitude of the torque being transmitted comprising a driving element connected to the driving shaft and a driven element connected to the driven shaft, the two elements being co-axial and capable of limited angular movement in relation to one another, torque being transmitted from the driving to the driven element by liquid under pressure, such pressure varying with the amount of torque whereby a measurement of the pressure gives an indication of the torque being transmitted said driving element consisting of a spider having a plurality of radial arms arranged at equal angular distances apart and said driven element consisting of an annulus surrounding the driving element and having the same number of radial arms which project inwards towards the boss of the driving element and are interspaced between the arms of the latter, the interspaced radial arms of the two elements thus forming a series of chambers the number of which is twice the number of arms on each element, half the number of these chambers being filled under running conditions with liquid under pressure, the magnitude of which depends upon the magnitude of the torque to be transmitted, and the remaining chambers which alternate with those filled with liquid under high pressure being filled with liquid under relatively low pressure, an external pump to which the high pressure chambers are connected for giving a continuous supply of liquid under pressure thereto, a reservoir from which the pump sucks the liquid and to which the low pressure chambers are connected, the high pressure chambers being also connected to the low pressure chambers to provide a passage for the escape of surplus liquid from the former the area of which passage is automatically varied so as to build up a differential pressure of liquid acting upon the surface of the radial arms to transmit torque from the driving to the driven element and a pressure indicating device connected to the high pressure supply to provide an indication of the torque transmitted.

3. A transmission dynamometer capable of transmitting power from a driving shaft to a driven shaft and also of indicating the magnitude of the torque being transmitted comprising a driving element connected to the driving shaft and a driven element connected to the driven shaft, the two elements being co-axial and capable of limited angular movement in relation to one another, torque being transmitted from the driving to the driven element by liquid under pressure, such pressure varying with the amount of torque whereby a measurement of the pressure gives an indication of the torque being transmitted said driving element consisting of a spider having a plurality of radial arms arranged at equal angular distances apart and said driven element consisting of an annulus surrounding the driving element and having the same number of radial arms which projects inwards towards the boss of the driving element and are interspaced between the arms of the latter, the interspaced radial arms of the two elements thus forming a series of chambers the number of which is twice the number of arms on each element, half the number of these chambers being filled under running conditions with liquid under pressure, the magnitude of which depends upon the magnitude of the torque to be transmitted, and the remaining chambers which alternate with those filled with liquid under high pressure being filled with liquid under relatively low pressure an external pump to which the high pressure chambers are connected for giving a continuous supply of liquid under pressure thereto, a reservoir from which the pump sucks the liquid and to which the low pressure chambers are connected, the high pressure chambers being also connected to the low pressure chambers to provide a passage for the escape of surplus liquid from the former the area of which passage is automatically varied so as to build up a differential pressure of liquid acting upon the surface of the radial arms to transmit torque from the driving to the driven element and a differential pressure gauge connected between the high pressure liquid supply and the low pressure liquid return, the gauge being calibrated in terms of torque.

4. A transmission dynamometer capable of transmitting power from a driving shaft to a driven shaft and also of indicating the magnitude of the torque being transmitted comprising a driving element connected to the driving shaft and a driven element connected to the driven shaft, the two elements being co-axial and capable of limited angular movement in relation to one another, torque being transmitted from the driving to the driven element by liquid under pressure, such pressure varying with the amount of torque whereby a measurement of the pressure gives an indication of the torque being transmitted, said driving element consisting of a spider having a plurality of radial arms arranged at equal angular distances apart and said driven element consisting of an annulus surrounding the driving element and having the same number of radial arms which project inwards towards the boss of the driving element and are interspaced between the arms of the latter, the interspaced radial arms of the two elements thus forming a series of chambers the number of which is twice the number of arms on each element, half the number of these chambers being filled under running conditions with liquid under pressure, the magnitude of which depends upon the magnitude of the torque to be transmitted, and the remaining chambers which alternate with those filled with liquid under high pressure being filled with liquid under relatively low pressure, an external pump to which the high pressure chambers are connected for giving a continuous supply of liquid under pressure thereto, a reservoir from which the pump sucks the liquid and to which the low pressure chambers are connected, the high pressure chambers being also connected to the low pressure chambers to provide a passage for the escape of surplus liquid from the former the area of which passage is automatically varied so as to build up a differential pressure of liquid acting upon the surface of the radial arms to transmit torque from the driving to the driven element and a pressure weighing device connected between the high pressure liquid supply and the low pressure liquid return, the indicating portion of such device being calibrated in terms of torque.

GEORGE HENRY WALKER.